(12) United States Patent
Ito et al.

(10) Patent No.: US 12,391,121 B2
(45) Date of Patent: Aug. 19, 2025

(54) VEHICULAR POWER SUPPLY SYSTEM

(71) Applicant: DENSO CORPORATION, Kariya (JP)

(72) Inventors: Akihiko Ito, Kariya (JP); Akira Sumi, Kariya (JP); Yasuhito Tanabe, Kariya (JP); Dachao Wang, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/586,737

(22) Filed: Feb. 26, 2024

(65) Prior Publication Data

US 2024/0190252 A1    Jun. 13, 2024

Related U.S. Application Data

(63) Continuation of application No. PCT/JP2022/030778, filed on Aug. 12, 2022.

(30) Foreign Application Priority Data

Aug. 24, 2021 (JP) ................................ 2021-136438

(51) Int. Cl.
*B60L 3/04* (2006.01)
*B60L 3/00* (2019.01)
(Continued)

(52) U.S. Cl.
CPC ............... *B60L 3/04* (2013.01); *B60L 3/0046* (2013.01); *B60L 3/0084* (2013.01); *B60L 58/12* (2019.02);
(Continued)

(58) Field of Classification Search
CPC .......... B60L 3/04; B60L 58/19; B60L 3/0046; B60L 2240/549; H02J 7/0048; H02J 7/0024; H02J 7/345
See application file for complete search history.

(56) References Cited

U.S. PATENT DOCUMENTS

| | | | |
|---|---|---|---|
| 11,646,578 B2 * | 5/2023 | Yasoshima | H02J 7/0024 307/80 |
| 2015/0255979 A1 | 9/2015 | Kaita et al. | |

(Continued)

FOREIGN PATENT DOCUMENTS

| | | |
|---|---|---|
| JP | 2008-195255 A | 8/2008 |
| JP | 2008-312396 A | 12/2008 |

(Continued)

*Primary Examiner* — Jared Fureman
*Assistant Examiner* — Duc M Pham
(74) *Attorney, Agent, or Firm* — Oliff PLC

(57) ABSTRACT

A vehicular power supply system includes a sensor unit that detects a battery state of a storage battery and a control unit that performs instruction to perform energization and interruption thereof between the storage battery and the electrical load based on the battery state. The sensor unit includes a detection unit that detects the battery state of the storage battery, a switch drive unit that performs drive control of a switch unit provided between the storage battery and the electrical load, and a control unit that controls the switch drive unit. The control unit switches between the energization and interruption thereof between the storage battery and the electrical load. If determining an abnormality, the control unit determines whether to maintain the energization between the storage battery and the electrical load based on the battery state and switches between the energization and interruption thereof based on the determination.

8 Claims, 10 Drawing Sheets

(51) Int. Cl.
    *B60L 58/12*           (2019.01)
    *B60L 58/19*           (2019.01)
    *H02J 7/00*            (2006.01)
    *H02J 7/34*            (2006.01)

(52) U.S. Cl.
    CPC ............ *B60L 58/19* (2019.02); *H02J 7/0024* (2013.01); *H02J 7/0048* (2020.01); *H02J 7/0063* (2013.01); *H02J 7/00712* (2020.01); *H02J 7/345* (2013.01); *B60L 2240/549* (2013.01)

(56) References Cited

U.S. PATENT DOCUMENTS

| | | | |
|---|---|---|---|
| 2016/0325777 A1* | 11/2016 | Mori | .................... H02P 6/085 |
| 2017/0159634 A1* | 6/2017 | Fujimoto | ................ F02P 3/053 |
| 2019/0190294 A1 | 6/2019 | Sato et al. | |
| 2020/0195016 A1 | 6/2020 | Kimoto | |
| 2021/0011088 A1 | 1/2021 | Morimoto et al. | |
| 2021/0394621 A1 | 12/2021 | Kamio | |

FOREIGN PATENT DOCUMENTS

| | | | |
|---|---|---|---|
| JP | 2012-093343 A | 5/2012 |
| JP | 2017-051036 A | 3/2017 |
| JP | 2019-176559 A | 10/2019 |

* cited by examiner

VEHICULAR POWER SUPPLY SYSTEM

CROSS-REFERENCE TO RELATED APPLICATION

The present application is based on and claims the benefit of priority from earlier Japanese Patent Application No. 2021-136438 filed on Aug. 24, 2021, the description of which is incorporated herein by reference.

BACKGROUND

Technical Field

The present disclosure relates to a vehicular power supply system.

Related Art

Power supply systems have been known which include a sensor unit that detects a state (voltage, current, ground fault, and the like) of a storage battery, and an ECU that receives a detection result from the sensor unit and controls, based on the received detection result, on/off operation of a relay switch that switches between energization and interruption of energization between the storage battery and an electrical load (including a generator such as a rotary electric machine).

SUMMARY

According to an aspect of the present disclosure, a vehicular power supply system is provided which includes a sensor unit that detects a battery state of a storage battery that is capable of supplying electrical power to an electrical load, and a control unit that receives the battery state from the sensor unit via a communication path and performs instruction to perform energization and interruption of the energization between the storage battery and the electrical load based on the received battery state.

The sensor unit includes: a detection unit that detects the battery state of the storage battery; a switch drive unit that performs drive control of a switch unit provided between the storage battery and the electrical load; and a control unit that controls the switch drive unit. The control unit controls the switch drive unit based on the instruction from the control unit to switch between the energization and interruption of the energization between the storage battery and the electrical load.

If determining an abnormality in the control unit or the communication path, the control unit determines whether to maintain the energization between the storage battery and the electrical load based on the battery state detected by the detection unit and controls the switch drive unit based on the determination to switch between the energization and interruption of the energization between the storage battery and the electrical load.

The detection unit includes a first current detection unit that detects a first current value at a first point on an electrical path between the storage battery and the electrical load and a second current detection unit that detects a second current value at a second point different from the first point on the electrical path.

If the first current value is a first threshold value or greater and the second current value is a second threshold value or greater, the switch drive unit performs drive control of the switch unit to interrupt the energization between the storage battery and the electrical load.

If the number of times the first current value is the first threshold value or more is a predetermined first number of times or more and if the number of times the second current value is the second threshold value or more is a second number of times, which is different from the first number of times, or more, the switch drive unit performs drive control of the switch unit to interrupt the energization between the storage battery and the electrical load.

DETAILED DESCRIPTION OF THE PREFERRED EMBODIMENTS

Figure 1:
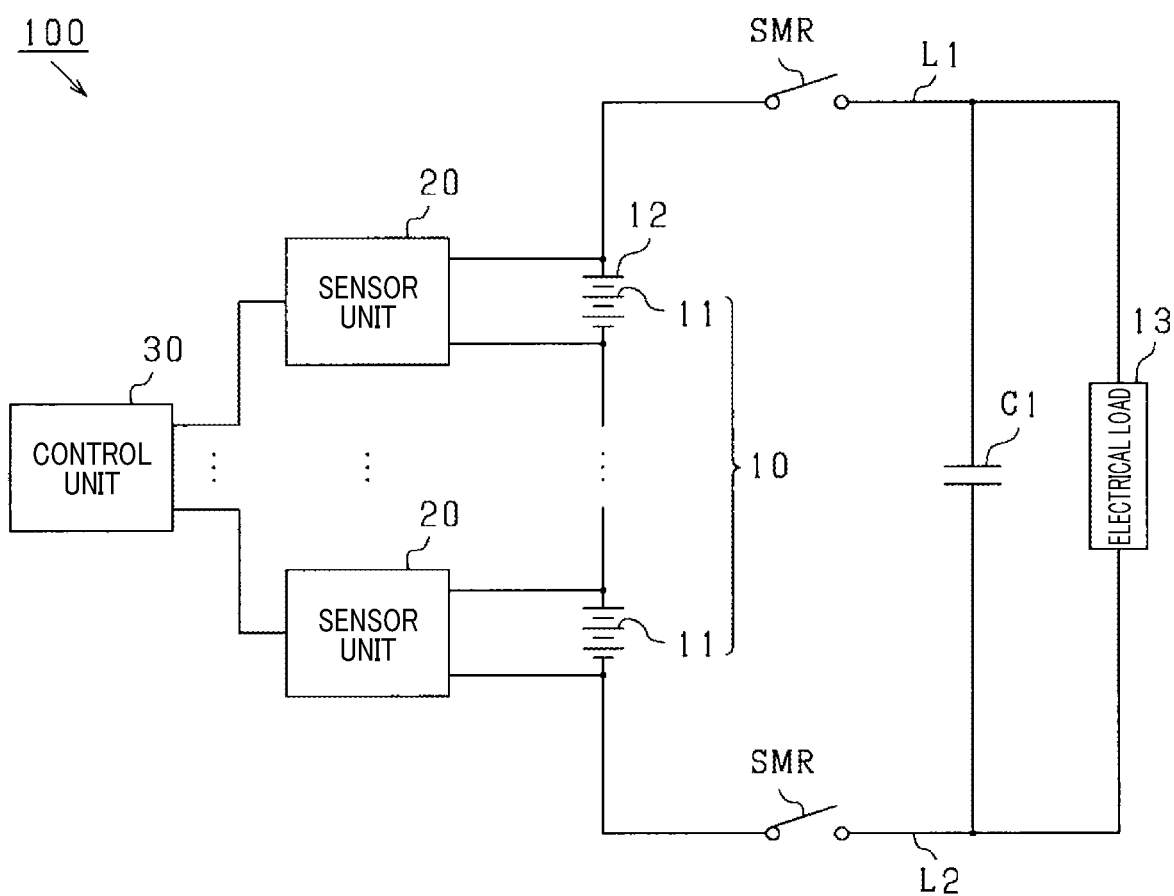
FIG. 1 is a diagram illustrating a configuration of a vehicular power supply system.

Power supply systems have been known which include a sensor unit that detects a state (voltage, current, ground fault, and the like) of a storage battery, and an ECU that receives a detection result from the sensor unit and controls, based on the received detection result, on/off operation of a relay switch that switches between energization and interruption of energization between the storage battery and an electrical load (including a generator such as a rotary electric machine) (e.g., JP 2021-16247 A).

Incidentally, in a case of a power supply system disclosed in JP 2021-16247 A, if communication between the sensor unit and the ECU breaks down, in order to prevent overdischarge and overcharge of the storage battery, the relay switch is typically turned off to interrupt energization between the storage battery and the electrical load, thereby ensuring safety.

However, as in an electrical vehicle, when a rotary electric machine is used as a traction unit, a problem is caused that if power supply from the storage battery is stopped, the electrical vehicle immediately stops.

In view of the above problem, the present disclosure has an object of providing a vehicular power supply system that can supply electrical power from a storage battery for a certain time even when communication is broken.

Hereinafter, embodiments in which a vehicular power supply system is applied to a vehicle (e.g., an electrical vehicle) will be described with reference to the drawings. It is noted that, in the following embodiments, the same or equivalent portions are given the same reference numerals in the drawings, and descriptions of the portions given the same reference numerals are incorporated by reference.

First Embodiment

As illustrated in FIG. 1, a vehicular power supply system 100 includes an assembled battery 10, sensor units 20 that detect a battery state of the assembled battery 10, and a control unit 30 that is connected to the sensor units 20 and acquires the battery state from the sensor units 20 to perform various types of control based on the battery state.

The assembled battery 10 has a voltage across terminals of, for example, 100V or higher and is configured by connecting a plurality of battery modules 11 in series. Each of the battery modules 11 is configured by connecting a plurality of battery cells 12 in series. As the battery cell 12, for example, a lithium-ion storage cell or a nickel-hydrogen storage cell may be used. In the present embodiment, the battery module 11 corresponds to a storage battery.

The assembled battery 10 is connected to an electrical load 13 via an electrical path and supplies electrical power to the electrical load 13. It is noted that the electrical load 13 includes a rotary electric machine. The assembled battery 10 supplies electrical power for driving the rotary electric machine. In addition, the assembled battery 10 may be charged by the rotary electric machine.

Electrical paths L1, L2 connecting the assembled battery 10 and the electrical load 13 are provided with a system main relay SMR. In addition, the electrical load 13 is connected with a capacitor C1 in parallel.

The sensor units 20 are provided to the respective battery modules 11 and detect (monitor) battery states of the respective battery modules 11. The battery states may include voltage, current, SOC, SOH, internal impedance, battery temperature, and the like. In the description of the present embodiment, voltage and current are detected as the battery states of the battery modules 11. It is noted that the sensor units 20 may be provided not to the respective battery modules 11 but to respective groups of a plurality of battery cells 12. Alternatively, the sensor units 20 may be provided to the respective battery cells 12 or the respective assembled batteries 10. In addition, the sensor unit 20 may detect a battery state of each of the battery cells 12 or a battery state of the assembled battery 10.

Figure 2:
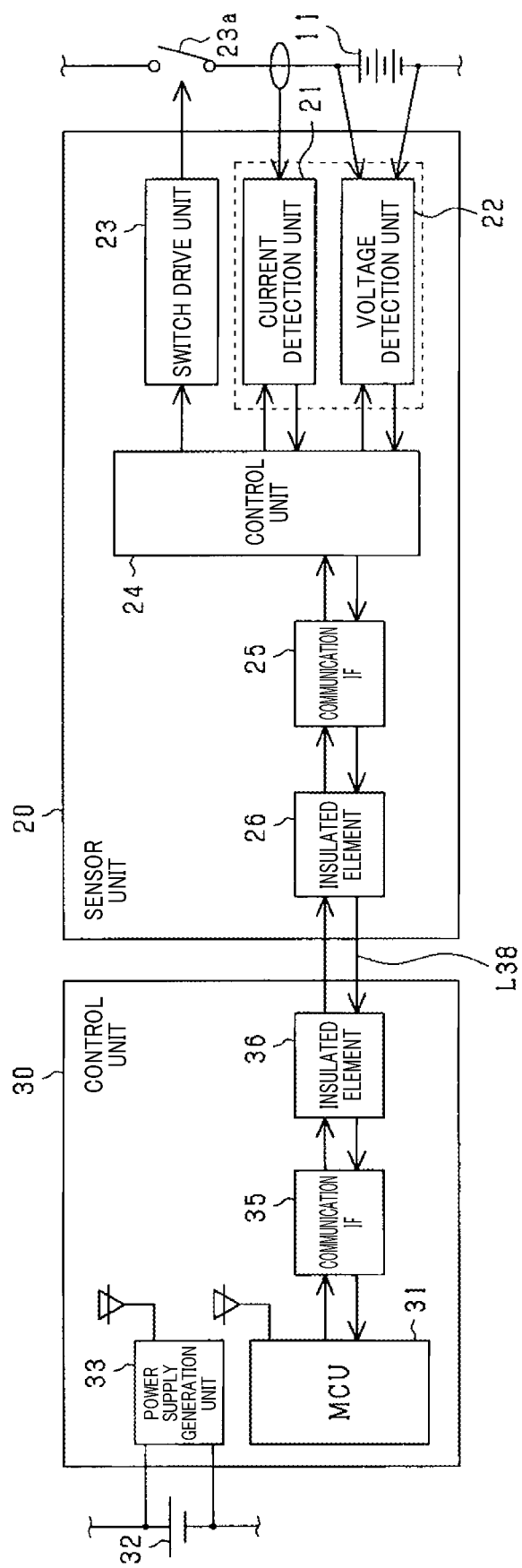
FIG. 2 is a diagram illustrating configurations of a control unit and a sensor unit.

Based on FIG. 2, the sensor unit 20 will be described in detail. The sensor unit 20 includes a current detection unit 21 that detects a current of the battery module 11, which is a detection target, and a voltage detection unit 22 that detects a voltage of the battery module 11, which is a detection target. In addition, on an electrical path connecting the battery module 11, which is a detection target, and the electrical load 13 (or on an electrical path connecting the battery modules 11 in series), a switch 23a is provided which is a switch unit that switches between energization and interruption of energization between the battery module 11, which is a detection target, and the electrical load 13. The sensor unit 20 includes a switch drive unit 23 that performs on/off-control of the switch 23a. The switch 23a is, for example, a relay switch. The switch 23a may be implemented by a pyro fuse.

In addition, the sensor unit 20 includes a control unit 24 that performs various types of control. The control unit 24 is configured by, for example, a microcomputer including a CPU, a memory, and the like. The control unit 24 is connected to the current detection unit 21, the voltage detection unit 22, and the switch drive unit 23. In addition, the control unit 24 is connected with an MCU 31 of the control unit 30 via a communication path L38, communication IFs 25, 35, and insulated elements 26, 36, and receives instructions from the control unit 30 and performs various processes based on the instructions. For example, if being instructed to detect battery states of the battery module 11, which is a detection target, by the control unit 30, the control unit 24 receives battery states (current and voltage) from the current detection unit 21 and the voltage detection unit 22 and outputs the received battery states to the control unit 30.

In addition, if being instructed to interrupt energization of the battery module 11, which is a detection target, by the control unit 30, the control unit 24 instructs the switch drive unit 23 to interrupt energization with the switch 23a. If receiving the instruction to interrupt energization from the control unit 24, the switch drive unit 23 turns off the switch 23a to interrupt energization of the battery module 11.

Next, the control unit 30 will be described. The control unit 30 includes an MCU (Micro Controller Unit) 31. The MCU 31 is a type of microcomputer including a CPU, a memory, and the like. The MCU 31 receives a request (accelerator position or the like) from the vehicle and performs an instruction to supply electrical power from the assembled battery 10 to the electrical load 13 based on the request from the vehicle and the battery states. Specifically, the MCU 31 performs on-control of the system main relay SMR. In addition, when the electrical load 13 includes a rotary electric machine and the like, the MCU 31 may perform on-control of the system main relay SMR and control charging the assembled battery 10.

In addition, if any abnormality has occurred in the assembled battery 10 or the like, the MCU 31 interrupts energization from the assembled battery 10 to the electrical load 13. Specifically, the MCU 31 performs off-control of the system main relay SMR and performs an instruction to perform off-control of the switch 23a.

In addition, the control unit 30 is connected with an auxiliary power supply 32. Electrical power supplied from the auxiliary power supply 32 is supplied to a power supply generation unit 33 provided in the control unit 30. The power supply generation unit 33 converts the electrical power supplied from the auxiliary power supply 32 to drive electrical power for the control unit 30 and supplies the drive electrical power to elements configuring the control unit 30 such as the MCU 31.

As described above, the MCU 31 of the control unit 30 is configured so as to switch between energization and interruption of energization between the assembled battery 10 (including the battery modules 11) and the electrical load. Hence, if communication with the sensor unit 20 is broken due to some problem, thereby being not capable of acquiring battery states from the sensor unit 20, the MCU 31 cannot perform energization and interruption of energization. Similarly, if an abnormality is caused in the MCU 31, energization and interruption of energization cannot be performed.

If an abnormality is caused in the communication path L38 or the MCU 31, it is desirable to interrupt energization between the assembled battery 10 and the electrical load 13 considering safety. However, in a case of an electrical vehicle, if energization is interrupted between the assembled battery 10 and the electrical load 13, power supply to the rotary electric machine serving as a traction unit (vehicle drive source) included in the electrical load 13 is also interrupted. In this case, the vehicle immediately stops. Hence, the vehicle may stop in such a manner as to obstruct the path of another vehicle on the road, which is a problem.

Meanwhile, even when an abnormality is caused in the communication path L38 or the MCU 31, no abnormality may be caused in the assembled battery 10, the electrical load 13, and the electrical paths L1, L2 therebetween. Hence, if there is no abnormality in the assembled battery 10 or the like, it is preferable to supply electrical power to the electrical load 13 for a certain time to allow the vehicle to move in such a degree as not to cause obstruction. Thus, in the present embodiment, the sensor unit 20 is configured as described below to allow the assembled battery 10 to supply electrical power for a certain time even when communication with the control unit 30 is broken.

Figure 3:
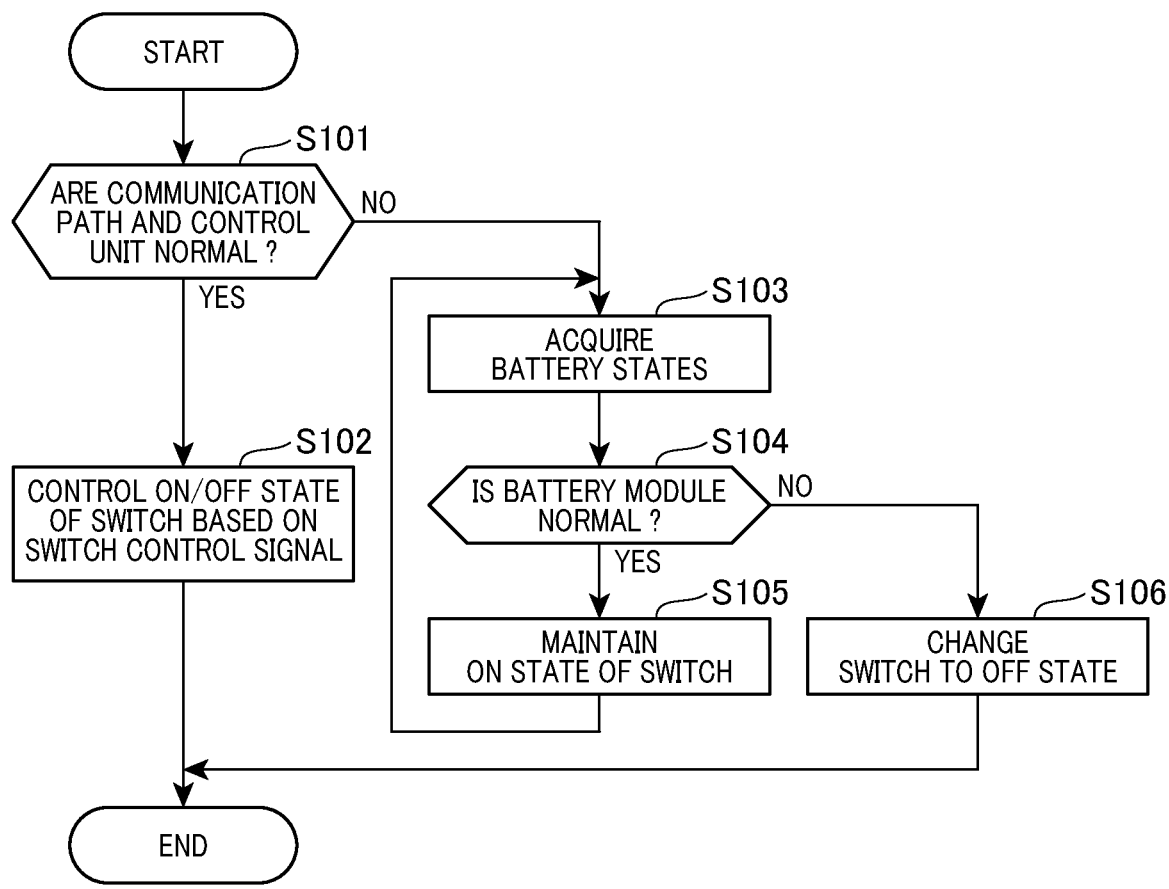
FIG. 3 is a flowchart of a switch control process.

Hereinafter, the configuration of the sensor unit 20, specifically, a switch control process performed by the control unit 24 will be described based on FIG. 3. The switch control process is performed by the control unit 24 at predetermined intervals.

The control unit 24 determines whether the communication path L38 and the MCU 31 are normal (step S101). Specifically, the control unit 24 detects a disconnection of the communication path L38 (including an abnormality of elements provided to the communication path L38) and an abnormality of the MCU 31. The disconnection of the communication path L38 can be detected by various methods such as using a voltage of the communication path L38, using a disconnection detection circuit, or the like. Similarly, an abnormality of the MCU 31 can be detected by various methods, for example, when there is no response from the MCU 31. These abnormality determination methods may be well-known methods.

If the determination result in step S101 is affirmative (if the communication path L38 and the MCU 31 are normal), the control unit 24 receives a switch control signal from the control unit 30 and controls on/off operation of the switch 23*a* based on the received switch control signal (step S102).

It is noted that the MCU 31 of the control unit 30 acquires switch control information concerning on/off operation of the switch 23*a* such as a vehicle request, a battery state, and the like, and outputs the switch control signal for performing an instruction to perform the on/off operation of the switch 23*a*.

In contrast, if the determination result in step S101 is negative (if the communication path L38 or the MCU 31 is abnormal), the control unit 24 acquires battery states (current and voltage) from the current detection unit 21 and the voltage detection unit 22 (step S103). Then, the control unit 24 determines whether the battery module 11, which is a detection target, is normal based on the acquired battery states (step S104). Specifically, the control unit 24 determines whether the received current and voltage are respectively within predetermined normal value ranges. It is noted that, in the present embodiment, although it is determined whether the battery module 11 is normal based on current and voltage, the determination may be based on any one of current and voltage. Alternatively, a value other than current and voltage may be received and combined therewith to make the determination, or may make the determination based on the value other than current and voltage.

If the determination result in step S104 is affirmative (if the received current and voltage are within the normal value ranges), the control unit 24 performs energization maintenance control that makes the switch drive unit 23 maintain an on state (energization state) of the switch 23*a* (step S105). Then, after a predetermined time period has elapsed, the control unit 24 performs processing of step S103 again.

In contrast, if the determination result in step S104 is negative (if the received current and voltage are not within the normal value ranges), the control unit 24 performs energization interruption control for the switch drive unit 23 so that the switch 23*a* becomes an off state (energization interruption state) (step S106). Specifically, the control unit 24 instructs the switch drive unit 23 to perform energization interruption with the switch 23*a*. On receiving the instruction for energization interruption from the control unit 24, the switch drive unit 23 turns off the switch 23*a* to interrupt energization of the battery module 11.

The configuration of the present embodiment provides the following significant effects.

If an abnormality is caused in the control unit 30 or the communication path L38, the control unit 24 acquires battery states from the current detection unit 21 and the voltage detection unit 22 and determines whether to maintain energization between the battery module 11 and the electrical load 13 based on the acquired battery states. If determining to interrupt energization between the battery module 11 and the electrical load 13, the control unit 24 instructs the switch drive unit 23 to interrupt energization based on the determination. The switch drive unit 23 performs off-control of the switch 23*a* based on the instruction for the energization interruption. Hence, if an abnormality is caused in the control unit 30 or the communication path L38, power supply from the battery module 11 is stopped, and the vehicle can be prevented from being immediately stopped.

If an abnormality is caused in the control unit 30 or the communication path L38, the control unit 24 acquires battery states every time a predetermined time period elapses and determines whether to maintain energization based on the battery states. Hence, after it is determined to maintain energization, if an abnormality is caused in the battery module 11, energization interruption can be performed to protect the battery module 11 and the like.

Modifications of First Embodiment

In the above first embodiment, after it is determined to maintain energization, if a predetermined saving time has elapsed, the control unit 24 may perform energization interruption. The saving time is preferably a time period (e.g. about five minutes) during which the own vehicle can be moved to the side of the road at which no obstruction to travel of other vehicles is caused. Hence, the battery module 11 and the like can be protected more reliably.

In the above first embodiment, a power supply generation unit, which is supplied with electrical power from the battery module 11 and generates drive electrical power for the sensor unit 20, may be provided to the sensor unit 20. Hence, even if a power line between the sensor unit 20 and control unit 30 is broken, the sensor unit 20 can be driven.

Second Embodiment

The configuration of the above first embodiment may be modified as the following second embodiment. Hereinafter, in the second embodiment, part different from the configurations described in the above embodiments will be mainly described. In addition, in the second embodiment, as a basic configuration, the vehicular power supply system 100 of the first embodiment will be exemplified.

Figure 4:
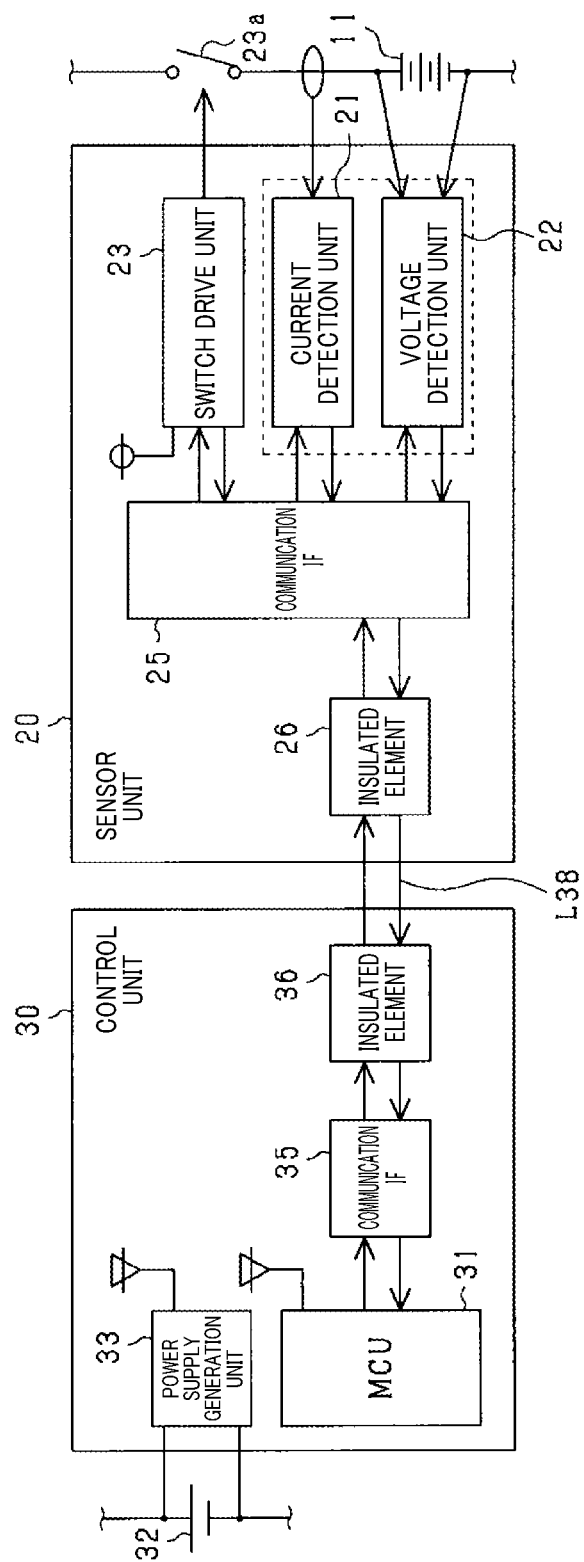
FIG. 4 is a diagram illustrating configurations of a control unit and a sensor unit according to a second embodiment.

Configurations of the control unit 30 and the sensor unit 20 according to the second embodiment will be described with reference to FIG. 4. First, the configuration of the control unit 30 will be described. The MCU 31 of the control unit 30 acquires switch control information concerning on/off operation of the switch 23a such as a vehicle request, battery states, and the like. Then, the MCU 31 determines whether to turn on or off the switch 23a based on the switch control information and outputs a switch control signal for instructing the sensor unit 20 to perform on/off operation of the switch 23a. For example, if the assembled battery 10 and the like are normal, the MCU 31 outputs a switch control signal for performing instruction to perform on operation of the switch 23a. In contrast, if an abnormality is caused in the assembled battery 10 or the like, the MCU 31 outputs a switch control signal for performing instruction to perform off operation of the switch 23a.

In addition, if the control unit 30 and the communication path L38 are normal, the MCU 31 outputs a notification signal for making a notification that the control unit 30 and the communication path L38 are normal every time a certain time period T1 has elapsed. The certain time period T1 may be any time period, for example, 5 minutes.

Next, the sensor unit 20 will be described. As illustrated in FIG. 4, the sensor units 20 in the second embodiment does not include the control unit 24. Hence, if it is instructed to detect battery states of battery module 11, which is a detection target, by the control unit 30, the current detection unit 21 and the voltage detection unit 22 of the second embodiment directly receive the instruction. In addition, the current detection unit 21 and the voltage detection unit 22 have a configuration in which if being instructed to detect battery states, the current detection unit 21 and the voltage detection unit 22 detect battery states (current and voltage) and output the obtained battery states to the control unit 30. Alternatively, the current detection unit 21 and the voltage detection unit 22 may have a configuration in which the current detection unit 21 and the voltage detection unit 22 detect battery states (current and voltage) at predetermined intervals and output the obtained battery states to the control unit 30.

In addition, the switch drive unit 23 has a configuration in which if receiving a switch control signal from the control unit 30, the switch drive unit 23 changes on/off states of the switch 23a based on the switch control signal. That is, the switch drive unit 23 performs drive control of the switch 23a.

Figure 5:
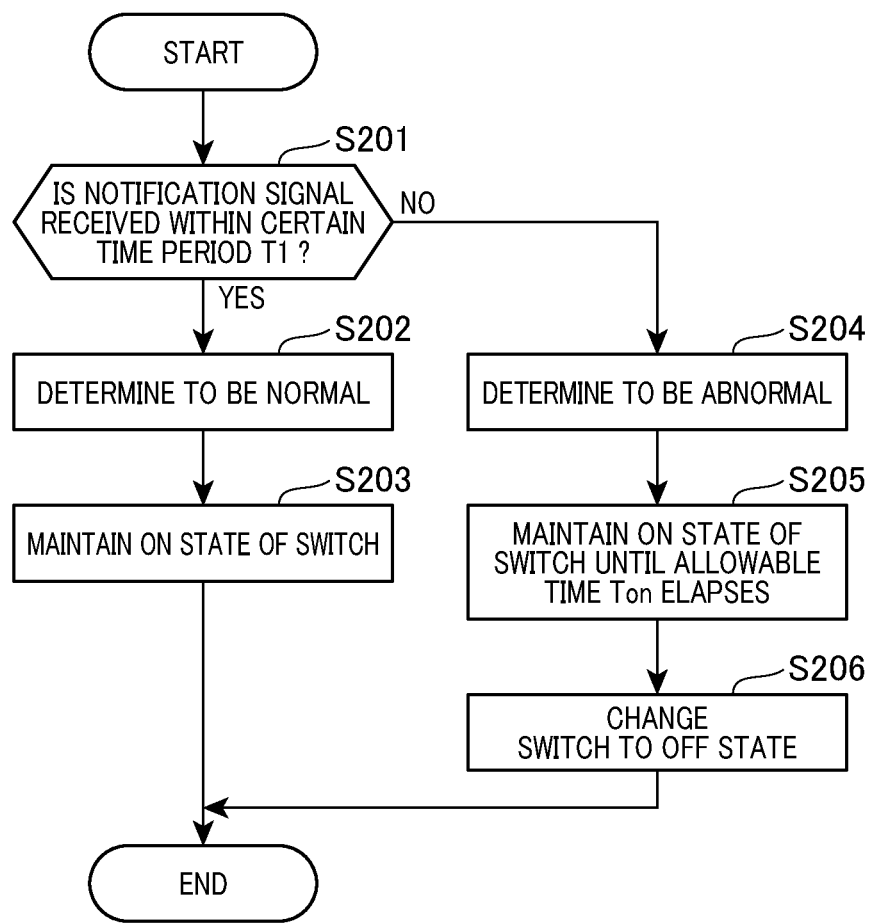
FIG. 5 is a flowchart of a switch drive process.

In addition, the switch drive unit 23 includes a drive latch function and has a configuration in which when receiving a notification signal from the control unit 30 until the certain time period T1 elapses, the switch drive unit 23 maintains an on state of the switch 23a. In contrast, the switch drive unit 23 has a configuration in which when receiving no notification signal from the control unit 30 until the certain time period T1 elapses, the switch drive unit 23 changes the switch 23a to an off state. Hereinafter, a switch drive process for implementing this function will be described based on FIG. 5. The switch drive process is performed by the switch drive unit 23 at predetermined intervals.

The switch drive unit 23 determines whether a notification signal is received from the control unit 30 within the certain time period T1 (step S201). If the determination result is affirmative, the switch drive unit 23 determines that the communication path, the MCU 31, or the like is normal (step S202). Then, the control unit 24 maintains an on state of the switch 23a (step S203).

In contrast, if the determination result in step S201 is negative, the switch drive unit 23 determines that an abnormality is caused in the communication path L38, the MCU 31, or the like (step S204). Then, the switch drive unit 23 maintains an on state of the switch 23a until a predetermined allowable time Ton elapses (step s205). The allowable time To is a time period (e.g. about five minutes) during which the own vehicle can be moved to the side of the road at which no obstruction to travel of other vehicles is caused, and is preferably as short as possible. After the allowable time Ton has elapsed, the switch drive unit 23 changes the switch 23a to an off state to interrupt energization of the battery module 11 (step s206).

Effects of the Second Embodiment Will be Described.

If receiving a notification signal from the control unit 30 until the certain time period T1 has elapsed, the switch drive unit 23 determines that the communication path L38 and the like are normal and maintains an on state of the switch 23a. In contrast, if receiving no notification signal from the control unit 30 until the certain time period T1 has elapsed, the switch drive unit 23 determines that an abnormality has occurred and changes the switch 23a to an off state. Thus, without the control unit 24 determining an abnormality, the simple mechanism can maintain energization for a while and thereafter interrupt the energization.

Modifications of Second Embodiment

In the above second embodiment, the switch drive unit 23 determines whether to maintain an on state of the switch 23a based on the battery states detected by the current detection unit 21 and the voltage detection unit 22.

Third Embodiment

The configuration of the above first embodiment may be modified as the following third embodiment. Hereinafter, in the third embodiment, part different from the configurations described in the above embodiments will be mainly described. In addition, in the third embodiment, as a basic configuration, the vehicular power supply system 100 of the first embodiment will be exemplified.

Figure 6:
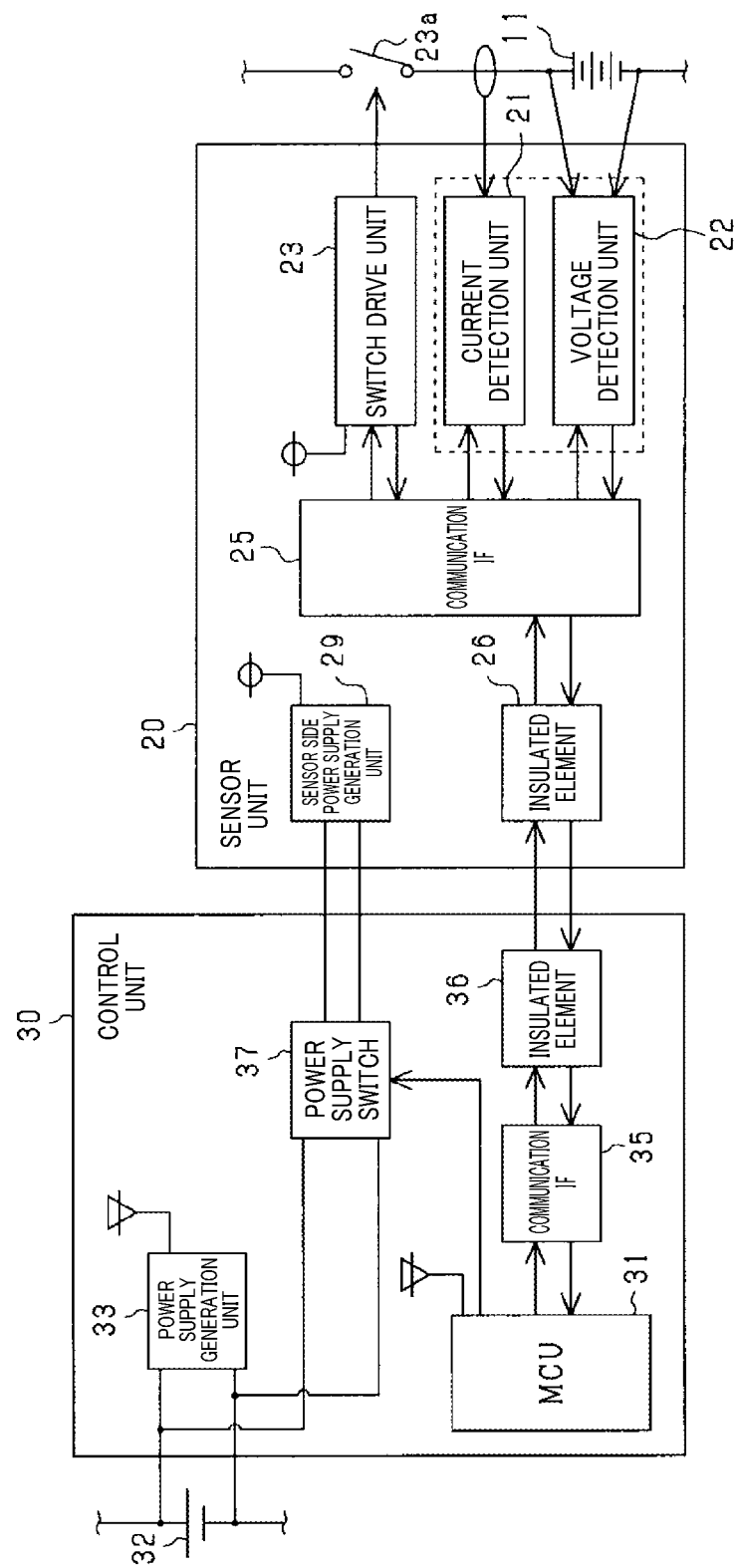
FIG. 6 is a diagram illustrating configurations of a control unit and a sensor unit according to a third embodiment.

The sensor unit 20 according to the third embodiment will be described. As illustrated in FIG. 6, the sensor unit 20 according to the third embodiment does not include the control unit 24. Hence, the current detection unit 21 and the voltage detection unit 22 according to the third embodiment has a configuration in which if being instructed to detect battery states of the battery module 11, which is a detection target, by the control unit 30 (or at predetermined intervals), the current detection unit 21 and the voltage detection unit 22 detect battery states (current and voltage) and output the obtained battery states to the control unit 30. Alternatively, the current detection unit 21 and the voltage detection unit 22 may have a configuration in which the current detection unit 21 and the voltage detection unit 22 detect battery states (current and voltage) at predetermined intervals and output the obtained battery states to the control unit 30.

In addition, as in the second embodiment, the MCU 31 is configured to output a switch control signal. The switch drive unit 23 has a configuration in which if receiving a switch control signal from the control unit 30, the switch drive unit 23 changes on/off states of the switch 23a based on the switch control signal.

In addition, the switch drive unit 23 is connected to a sensor side power supply generation unit 29 provided to the sensor unit 20, and the sensor side power supply generation unit 29 supplies drive electrical power. The sensor side power supply generation unit 29 is connected with the power supply generation unit 33 of the control unit 30, and the power supply generation unit 33 supplies electrical power. A power supply switch 37 is provided between the power supply generation unit 33 and the sensor side power supply generation unit 29 and is configured to be turned on and off by the MCU 31. That is, the switch drive unit 23 is configured to maintain an on state of the switch 23a using electrical power supplied from the power supply generation unit 33 as drive electrical power. Hence, if the power supply switch 37 is changed to an off state, and supply of drive electrical power from control unit 30 is interrupted, the on state of the switch 23a cannot be maintained, and the switch 23a is changed to an off state.

Figure 7:
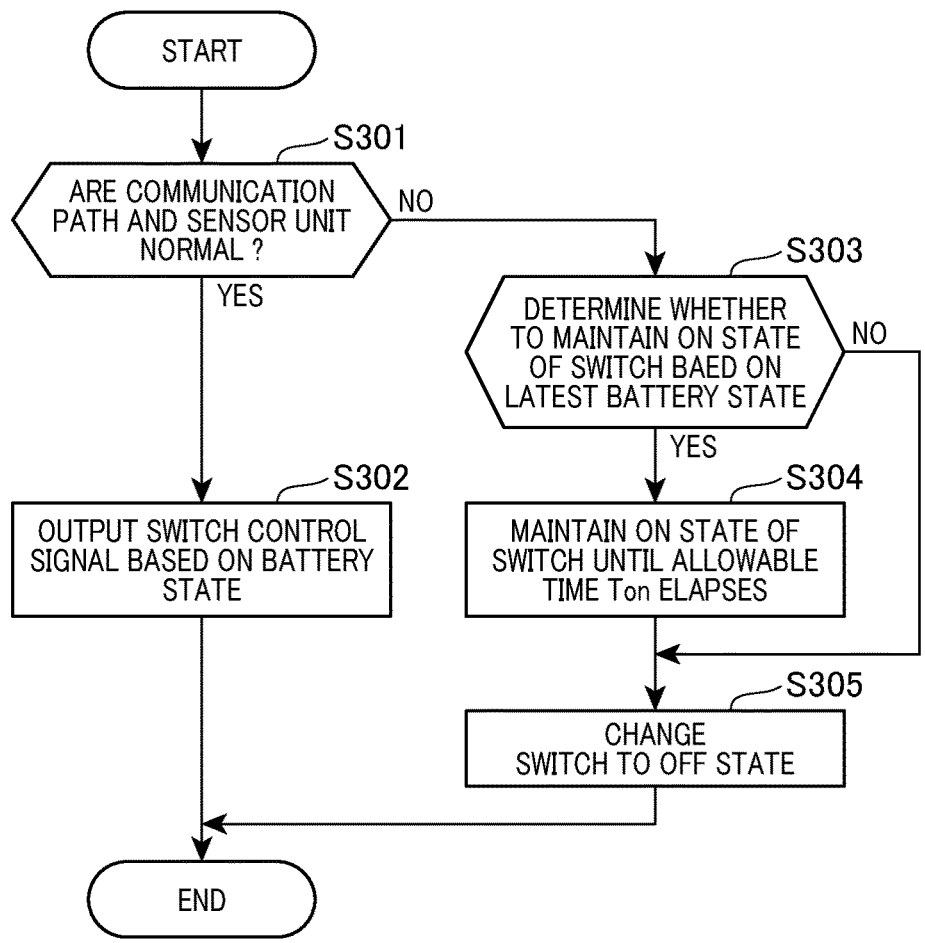
FIG. 7 is a flowchart of a switch drive instruction process.

The configuration of the control unit 30 according to the third embodiment will be described. The MCU 31 of the control unit 30 performs a switch drive instruction process illustrated in FIG. 7 at predetermined intervals. The MCU 31 determines whether the communication path L38 and the sensor unit 20 are normal (step S301). Specifically, the MCU 31 detects a disconnection of the communication path L38 (including an abnormality of elements provided to the communication path L38) and an abnormality of the sensor unit 20. The method of detecting a disconnection of the communication path L38 is similar to that of the first embodiment. An abnormality of the sensor unit 20 can be detected by various methods, for example, when there is no response from the sensor unit 20, or when an abnormality signal is received from the sensor unit 20. These abnormality determination methods may be well-known methods.

If the determination result is affirmative, that is, if it is normal, the MCU 31 outputs a switch control signal based on battery states or the like (step S302). Then, the MCU 31 terminates the switch drive instruction process.

In contrast, if the determination result of step S301 is negative, that is, if an abnormality has occurred in the communication path L38 or the sensor unit 20, it is determined whether to maintain on state of the switch 23a based on the most recently acquired latest battery state (step S303).

If the determination result of step S303 is affirmative, the MCU 31 maintains electrical power supply to the sensor unit 20 for the predetermined allowable time Ton (step S304). Hence, since drive electrical power is continuously supplied to the switch drive unit 23, the on state of the switch 23a is maintained. It is noted that, in step S304, the MCU 31 may notify an external device such as a host ECU of occurrence of an abnormality. The allowable time Ton is similar to that in the second embodiment.

Then, after the allowable time Ton has elapsed, the MCU 31 stops supplying drive electrical power to the sensor unit 20 (step S305). Hence, since the switch drive unit 23 cannot maintain the on state of the switch 23a, the switch 23a is changed to an off state. As a result, the energization between the battery module 11 and the electrical load 13 is interrupted.

In addition, if the determination result of step S303 is affirmative, the MCU 31 proceeds to step S305 to stop supplying drive electrical power to the sensor unit 20. Hence, as described above, the energization between the battery module 11 and the electrical load 13 is interrupted.

Effects of the third embodiment will be described.

If an abnormality has occurred in the communication path L38 or the sensor unit 20, the MCU 31 stops supplying drive electrical power to the sensor unit 20 after the allowable time Ton has elapsed, and causes the switch 23a to change to an off state. Thus, without the control unit 24 determining an abnormality, the simple mechanism can maintain energization for a while and thereafter interrupt the energization.

Modifications of Third Embodiment

The above third embodiment may be combined with the above first embodiment or the above second embodiment. Thus, even if an abnormality is caused in any of the control unit 30 and the sensor unit 20, the vehicle can be prevented from being immediately stopped.

In the above third embodiment, if an abnormality has been caused in the communication path L38 or the like, it is determined whether to maintain on state of the switch 23a based on the latest battery state. However, without the determination, the on state may be maintained until the allowable time Ton elapses.

Fourth Embodiment

The configuration of the above first embodiment may be modified as the following fourth embodiment. Hereinafter, in the third embodiment, part different from the configurations described in the above embodiments will be mainly described. In addition, in the fourth embodiment, as a basic configuration, the vehicular power supply system 100 of the first embodiment will be exemplified.

Figure 8:
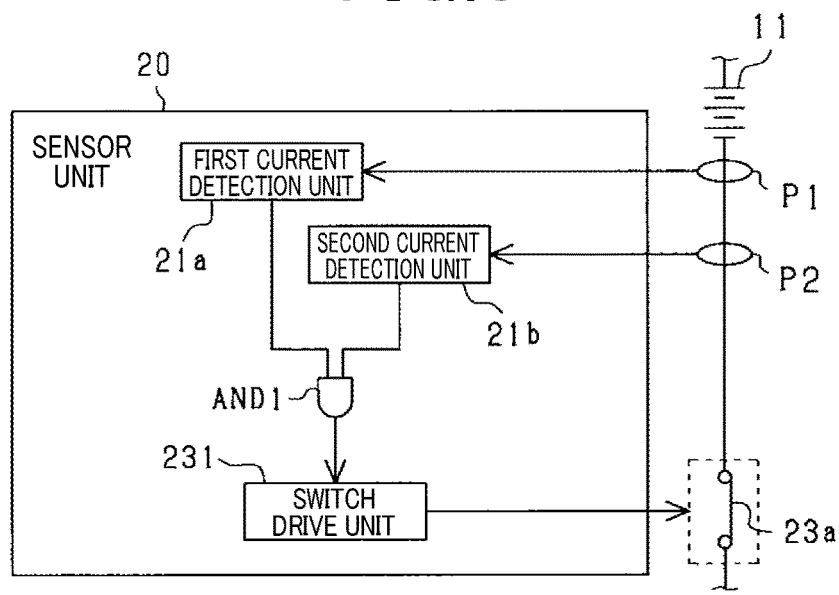
FIG. 8 is a diagram illustrating a configuration of a sensor unit according to a fourth embodiment.

As illustrated in FIG. 8, the sensor unit 20 according to the fourth embodiment includes a plurality of (two in the present embodiment) current detection unit 21. It is noted that, unlike the first embodiment, the voltage detection unit 22 may be included or not be included.

The two current detection units 21 detect currents at different positions. In the fourth embodiment, a first current detection unit 21a and a second current detection unit 21b are included. The first current detection unit 21a detects a current (first current value) at a first position P1 in the vicinity of the battery module 11 on the electrical path, which is a detection target, of the sensor unit 20. The second current detection unit 21b is farther from the battery module 11 than the first current detection unit 21a and detects a current (second current value) at a second position P2 in the vicinity of the switch 23a on the electrical path.

The first current detection unit 21a detects a current at the first position P1. If the value of the current is a predetermined first threshold value or greater, the first current detection unit 21a outputs a first detection signal indicating this. The second current detection unit 21b detects a current at the second position P2. If the value of the current is a predetermined second threshold value or greater, the second current detection unit 21b outputs a second detection signal indicating this. In the second embodiment, the first threshold value and the second threshold value are set to the same value Th.

Figure 9:
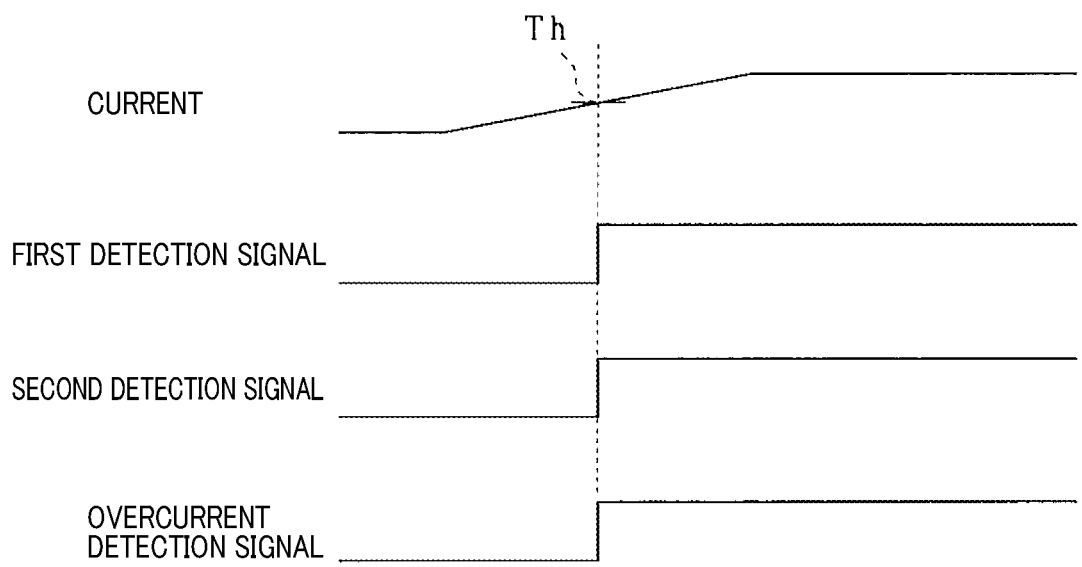
FIG. 9 is a timing chart illustrating input-output timings of signals according to the fourth embodiment.

The first current detection unit 21a and the second current detection unit 21b are configures to be connected to an AND circuit AND1 to which the first detection signal and the second detection signal are input. As illustrated in FIG. 9, if receiving the first detection signal and the second detection signal, the AND circuit AND1 outputs an overcurrent detection signal.

A switch drive unit 231 in the fourth embodiment is configured to be connected to the AND circuit AND1 and can receive the overcurrent detection signal. The switch drive unit 231 is configured to, on receiving the overcurrent detection signal from the AND circuit AND1, change the switch 23*a* from an on state to an off state.

Effects of the Fourth Embodiment Will be Described.

Since it is detected whether overcurrents are generated at different two positions (first position P1 and second position P2), noise resistance increases, whereby erroneous detection can be prevented.

Modifications of Fourth Embodiment

Figure 10:
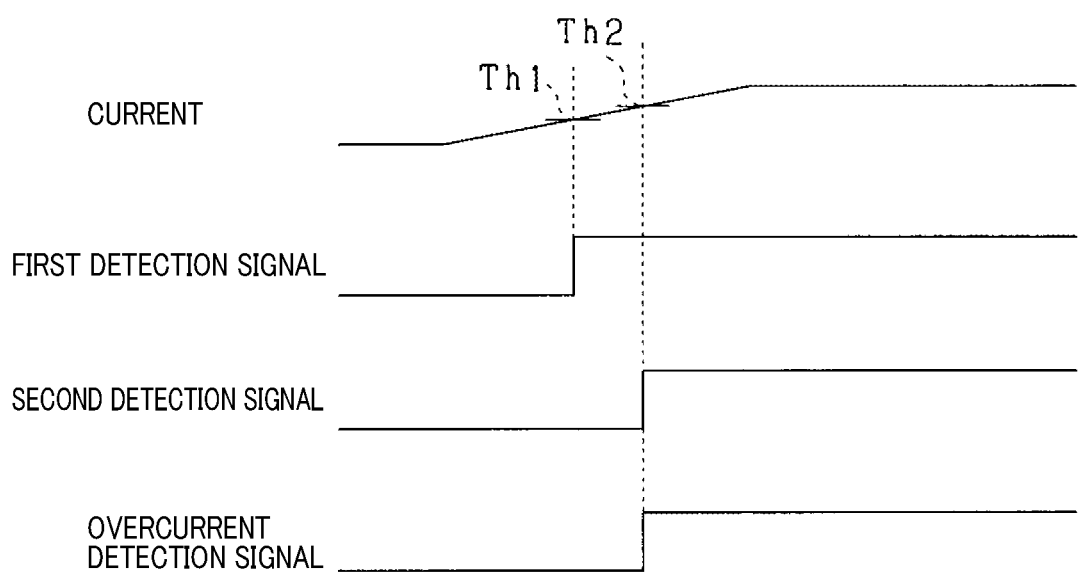
FIG. 10 is a timing chart illustrating input-output timings of signals according to a modification of the fourth embodiment.

In the above fourth embodiment, the first threshold value and the second threshold value are the same value. However, as illustrated in FIG. 10, the first threshold value and the second threshold value may be different values Th1 and Th2. Thus, even if noise is generated, malfunctions can be prevented.

In the fourth embodiment, the first current detection unit 21*a* and the second current detection unit 21*b* may differ in a sampling rate or an internal error count number of times. For example, the first current detection unit 21*a* may be configured to output the first detection signal if the number of times that the first threshold value is exceeded (first number of times) is a first internal error count number of times or more. The second current detection unit 21*b* may be configured to output the second detection signal if the number of times that the second threshold value is exceeded (second number of times) is a second internal error count number of times or more. In addition, the first current detection unit 21*a* may be configured to output the first detection signal if the time period during which the first threshold value is exceeded is a first time period or longer. The second current detection unit 21*b* may be configured to output the second detection signal if the time period during which the second threshold value is exceeded is a second time period or longer. Thus, when an overcurrent is generated only for an extremely short time due to influence of noise or the like, erroneous detection can be prevented.

In the fourth embodiment, the first current detection unit 21*a* may be a Hall sensor type or a shunt resistance type. Similarly, the second current detection unit 21*b* may be a Hall sensor type or a shunt resistance type. Thus, the first current detection unit 21*a* and the second current detection unit 21*b* can be appropriately changed according to required specifications.

The above fourth embodiment and the modifications thereof may be appropriately combined with the above second embodiment or the above third embodiment.

Five Embodiment

The configuration of the above fourth embodiment may be modified as the following fifth embodiment. Hereinafter, in the fifth embodiment, part different from the configurations described in the above embodiments will be mainly described. In addition, in the fifth embodiment, as a basic configuration, the vehicular power supply system 100 of the fourth embodiment will be exemplified.

Figure 11:
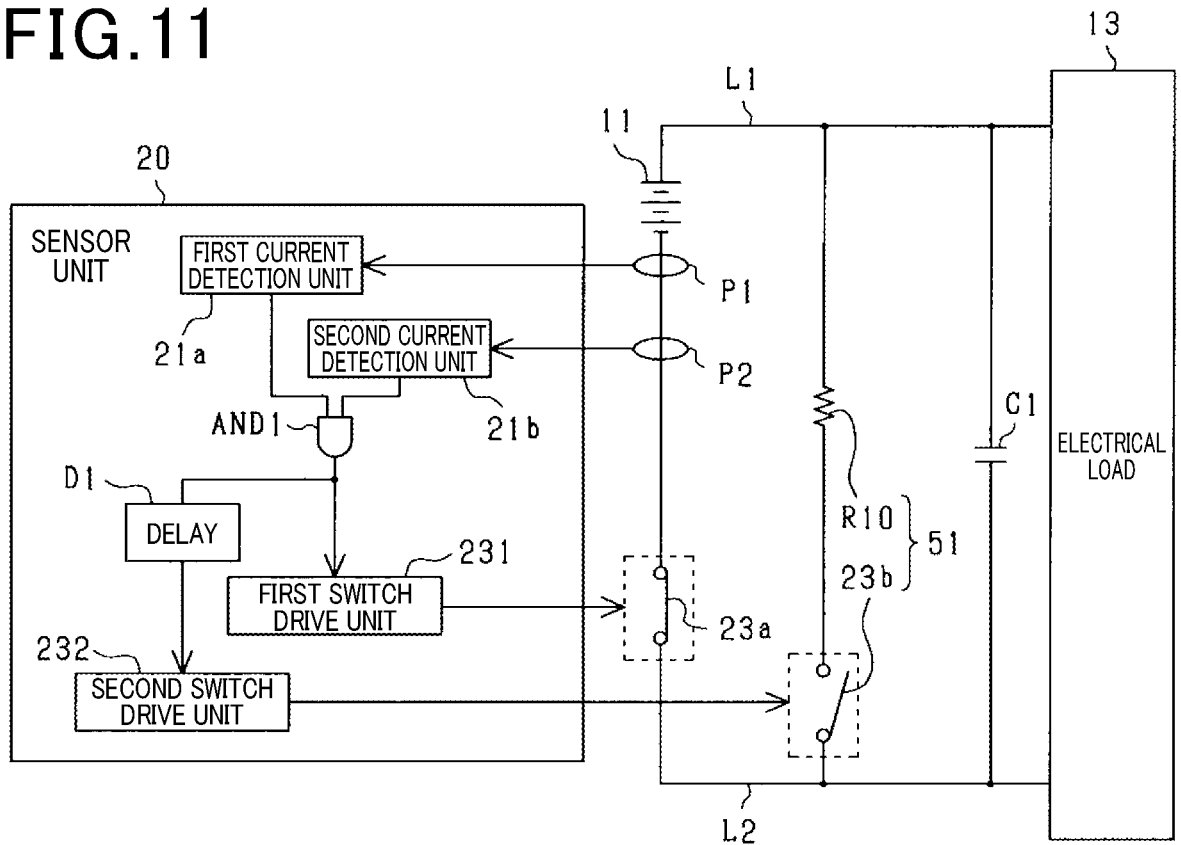
FIG. 11 is a diagram illustrating a configuration of a sensor unit according to a fifth embodiment.

As illustrated in FIG. 11, in the fifth embodiment, a discharge circuit 51 for quickly discharging charge of the capacitor C1 is provided between the battery module 11 and the electrical load 13. The discharge circuit 51 is connected with the capacitor C1, the battery module 11, and the electrical load 13 in parallel. The discharge circuit 51 is configured of a series connection of a resistor R10 and a switch 23*b*. The switch 23*b* is normally set so as to be an off state (energization interruption state).

The sensor unit 20 of the fifth embodiment includes, as in the fourth embodiment, the first current detection unit 21*a*, the second current detection unit 21*b*, the AND circuit AND1, and the switch drive unit 231. The sensor units 20 of the fifth embodiment includes, in addition to the above configuration, a second switch drive unit 232. It is noted, in the fifth embodiment, the switch drive unit 231 is referred to as a first switch drive unit 231 as a matter of convenience.

The second switch drive unit 232 is connected to an output terminal of the AND circuit AND1 via a delay circuit D1. As illustrated in FIG. 11, if the first detection signal and the second detection signal are input to the AND circuit AND1, and the AND circuit AND1 outputs an overcurrent detection signal, the overcurrent detection signal is input to the second switch drive unit 232 by the delay circuit D1 later than to the switch drive unit 231 by predetermined time.

On receiving the overcurrent detection signal, the second switch drive unit 232 changes the switch 23*b* to an on state. Hence, the switch 23*b* becomes an on state after the predetermined time elapses from when the first switch drive unit 231 changes the switch 23*a* to an off state. Thus, charge of the capacitor C1 is discharged by the discharge circuit 51.

Effects of the Fifth Embodiment Will be Described.

After the predetermined time has elapsed from when energization of the battery module 11 is interrupted, the second switch drive unit 232 changes the switch 23*b* to an on state to cause the discharge circuit 51 to discharge charge of the capacitor C1. Thus, the charge of the capacitor C1 can be quickly discharged.

Modifications of Fifth Embodiment

Figure 12:
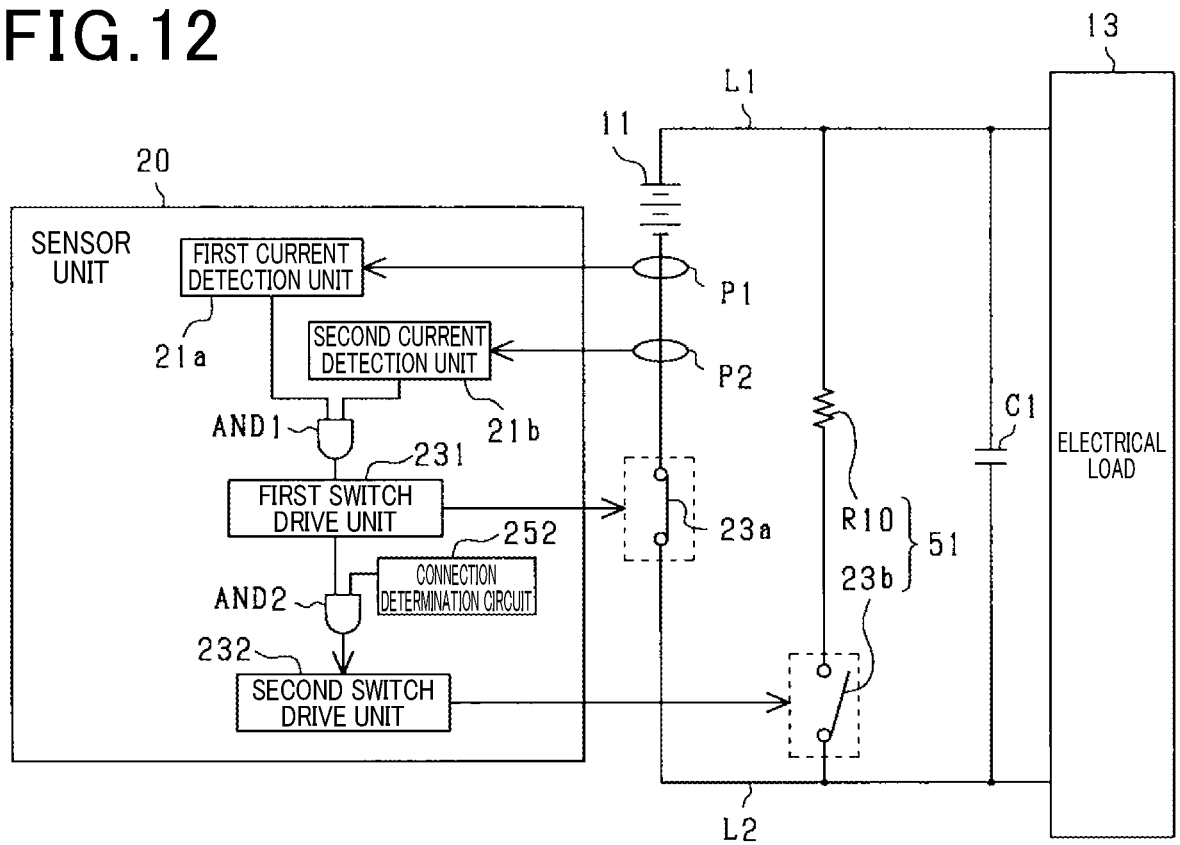
FIG. 12 is a diagram illustrating a configuration of a sensor unit according to a modification of the fifth embodiment.

In the above fifth embodiment, the second switch drive unit 232 is configured to turn on the switch 23*b* after the predetermined time has elapsed from when energization of the battery module 11 is interrupted. As another example, as illustrated in FIG. 12, a connection determination circuit 52 may be included which determines that the switch 23*a* has been changed to an off state. In addition, the second switch drive unit 232 may be configured to change the switch 23*b* to an on state if it is determined by the connection determination circuit 52 that the switch 23*a* has been changed to an off state.

The above fifth embodiment and the modifications thereof may be appropriately combined with the above second embodiment or the above third embodiment.

Sixth Embodiment

The configuration of the above fifth embodiment may be modified as the following sixth embodiment. Hereinafter, in the fifth embodiment, part different from the configurations described in the above embodiments will be mainly described. In addition, in the sixth embodiment, as a basic configuration, the vehicular power supply system 100 of the fifth embodiment will be exemplified.

Figure 13:
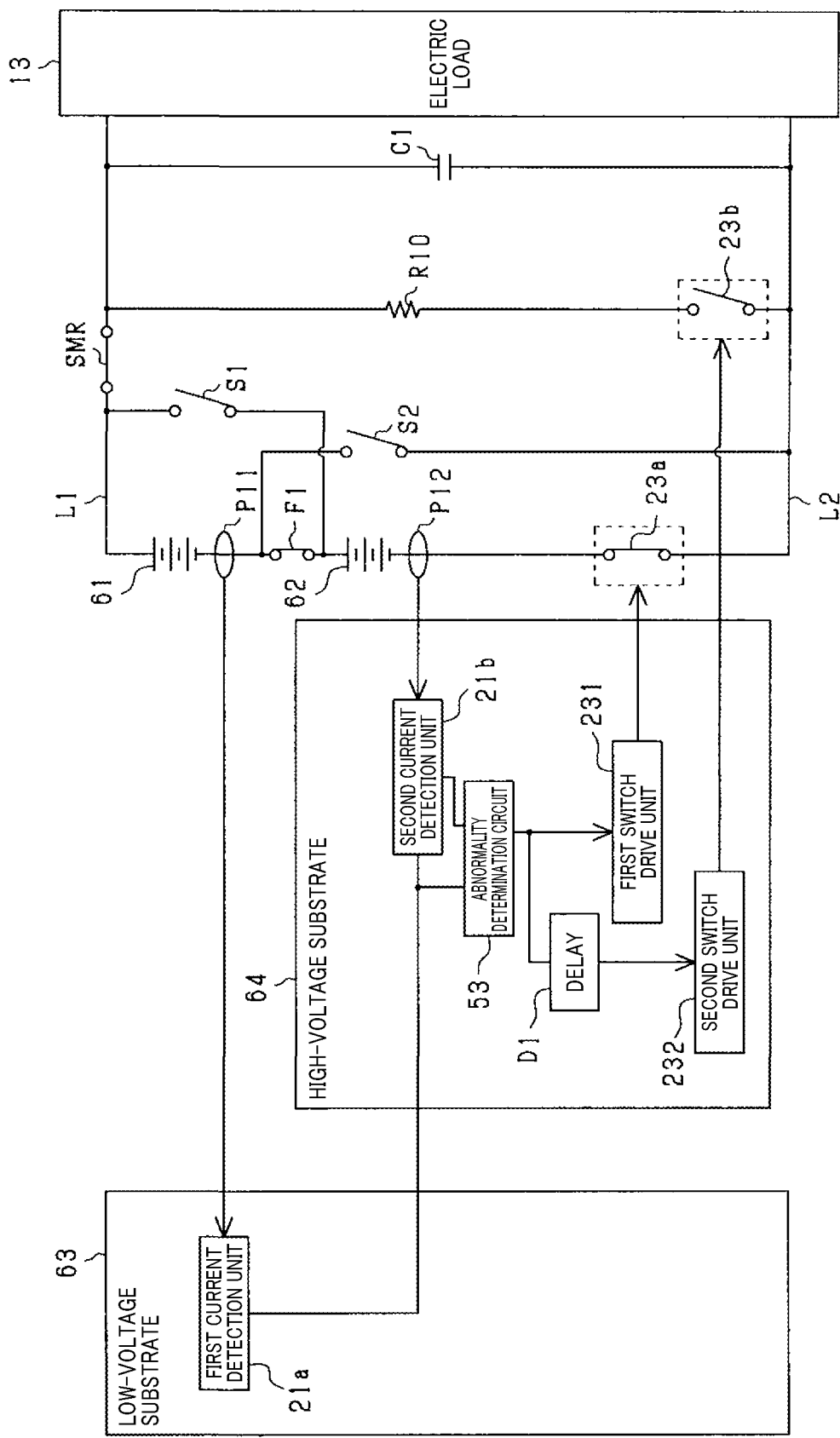
FIG. 13 is a diagram illustrating a configuration of a vehicular power supply system according to a sixth embodiment.

As illustrated in FIG. 13, the assembled battery 10 in the sixth embodiment is configured by a first battery module 61 and a second battery module 62. In addition, the first battery module 61 and the second battery module 62 are configured to be able to be changed between a serial connection and a parallel connection.

Specifically, the first battery module 61 and the second battery module 62 are connected in series via a switch F1. A first connection changing switch S1 is connected to the first battery module 61 in parallel. The first connection changing switch S1 has one end connected to a positive electrode side electrical path L1 and the other end connected between the switch F1 and the second battery module 62. Similarly, a second connection changing switch S2 is connected to the second battery module 62 in parallel. The second connection changing switch S2 has one end connected to a negative electrode side electrical path L2 and the other end connected between the switch F1 and the first battery module 61.

When the first battery module 61 and the second battery module 62 are connected in series, the first connection changing switch S1 and the second connection changing switch S2 are changed to off states. When the first battery module 61 and the second battery module 62 are connected in parallel, the first connection changing switch S1 and the second connection changing switch S2 are changed to on states.

The first connection changing switch S1 and the second connection changing switch S2 may be subjected to on/off-control by the control unit 30 or the sensor unit 20 or may be subjected to on/off-control by the host ECU or the like. It is noted that when electrical power is supplied from the assembled battery 10 to the electrical load 13, the first battery module 61 and the second battery module 62 are connected in series. In contrast, when electrical power is supplied from the rotary electric machine included in the electrical load 13 to the assembled battery 10 (i.e., when the assembled battery 10 is charged), the first battery module 61 and the second battery module 62 are connected in parallel.

In addition, in the sixth embodiment, the sensor unit 20 is provided with a low-voltage substrate 63 whose drive electrical power has a low voltage and a high-voltage substrate 64 whose drive electrical power is higher than that of the low-voltage substrate 63. The low-voltage substrate 63 is provided with the first current detection unit 21a. The high-voltage substrate 64 is provided with the second current detection unit 21b.

In the sixth embodiment, the first current detection unit 21a detects a current flowing through a first point P11 located on the negative electrode terminal side of the first battery module 61 with respect to a connection point of the second connection changing switch S2 on the electrical path between the first battery module 61 and the second battery module 62. The first point P11 is a point at which a current from the first battery module 61 can be detected in any connection manner.

In addition, in the sixth embodiment, the second current detection unit 21b detects a current flowing through a second point P12 located on the positive electrode terminal side of the second battery module 62 with respect to a connection point of the first connection changing switch S1 on the electrical path between the first battery module 61 and the second battery module 62. The second point P12 is a point at which a current from the second battery module 62 can be detected in any connection manner.

In the sixth embodiment, the first current detection unit 21a and the second current detection unit 21b are connected to an abnormality determination circuit 53. The abnormality determination circuit 53 is provided to the high-voltage substrate 64. The abnormality determination circuit 53 is configured to receive connection information concerning whether the first battery module 61 and the second battery module 62 are connected in series.

If the first battery module 61 and the second battery module 62 are connected in series, when receiving the first detection signal and the second detection signal, the abnormality determination circuit 53 outputs an overcurrent detection signal. In contrast, if the first battery module 61 and the second battery module 62 are connected in parallel (not in series), when receiving any of the first detection signal and the second detection signal, the abnormality determination circuit 53 outputs an overcurrent detection signal.

The sensor unit 20 of the sixth embodiment includes, as in the fifth embodiment, the first switch drive unit 231 and the second switch drive unit 232.

The first switch drive unit 231 in the sixth embodiment is connected to the abnormality determination circuit 53 and is configured to be able to receive the overcurrent detection signal. The first switch drive unit 231 is configures to, on receiving the overcurrent detection signal from the abnormality determination circuit 53, change the switch 23a from an on state to an off state.

The second switch drive unit 232 is connected to an output terminal of the abnormality determination circuit 53 via the delay circuit D1. As in the fifth embodiment, if the overcurrent detection signal is output from the abnormality determination circuit 53, the overcurrent detection signal is input to the second switch drive unit 232 by the delay circuit D1 later than to the first switch drive unit 231 by predetermined time.

On receiving the overcurrent detection signal, the second switch drive unit 232 changes the switch 23b to an on state. Hence, the switch 23b becomes an on state after the predetermined time elapses from when the first switch drive unit 231 changes the switch 23b to an off state. Thus, charge of the capacitor C1 is discharged by the discharge circuit 51.

The above sixth embodiment has, in addition to the effects of the above fifth embodiment, the following effects.

when electrical power is supplied from the assembled battery 10 to the electrical load 13, the first battery module 61 and the second battery module 62 are connected in series. In contrast, when electrical power is supplied from the rotary electric machine included in the electrical load 13 to the assembled battery 10 (i.e., when the assembled battery 10 is charged), the first battery module 61 and the second battery module 62 are connected in parallel. Hence, the charging voltage can be lowered, while the electrical power supplied to the electrical load 13 becomes a high voltage. Thus, the configuration for increasing the charging voltage supplied from the rotary electric machine can be omitted or simplified.

If the first battery module 61 and the second battery module 62 are connected in series, when receiving the first detection signal and the second detection signal, the abnormality determination circuit 53 outputs an overcurrent detection signal. In contrast, if the first battery module 61 and the second battery module 62 are connected in parallel, when receiving any of the first detection signal and the second detection signal, the abnormality determination circuit 53 outputs an overcurrent detection signal. Hence, depending on the connection manner, overcurrent can be appropriately detected. It is noted that when charged is performed, since energization is interrupted between the electrical load 13 other than the rotary electric machine and the assembled battery 10. Hence, it is expected that noise to the assembled battery 10 decreases. Thus, when the first battery module 61 and the second battery module 62 are connected in parallel, an overcurrent can be detected appropriately.

Modifications of Sixth Embodiment

The above embodiment may be configured to output an overcurrent detection signal in any communication state when the first detection signal and the second detection signal are output.

The above sixth embodiment and the modifications thereof may be appropriately combined with the above second embodiment or the above third embodiment.

In the above sixth embodiment, the sensor unit 20 is provided with the low-voltage substrate 63 and the high-voltage substrate 64 separately. However, the low-voltage substrate 63 and the high-voltage substrate 64 may not be separated.

In the above sixth embodiment, the first battery module 61 and the second battery module 62 may be configured to be connected in parallel when an abnormality has occurred. In addition, the first battery module 61 and the second battery module 62 may be configured to be connected in series if it is determined that no overcurrent has been generated.

In the above sixth embodiment, the first point P11 may be changed to any point in any connection manner if a current from the first battery module 61 can be detected at the point. Similarly, the second point P12 may be changed to any point in any connection manner if a current from the second battery module 62 can be detected at the point.

Hereinafter, characteristic configurations extracted from the embodiments described above will be described.

[Configuration 1]

A vehicular power supply system (100) including a sensor unit (20) that detects a battery state of a storage battery (11) that is capable of supplying electrical power to an electrical load (13), and a control unit (30) that receives the battery state from the sensor unit via a communication path (L38) and performs instruction to perform energization and interruption of the energization between the storage battery and the electrical load based on the received battery state, wherein the sensor unit includes:
a detection unit (21) that detects the battery state of the storage battery;
a switch drive unit (23) that performs drive control of a switch unit (23a) provided between the storage battery and the electrical load; and
a control unit (24) that controls the switch drive unit,
the control unit controls the switch drive unit based on the instruction from the control unit to switch between the energization and interruption of the energization between the storage battery and the electrical load, and
if determining an abnormality in the control unit or the communication path, the control unit determines whether to maintain the energization between the storage battery and the electrical load based on the battery state detected by the detection unit and controls the switch drive unit based on the determination to switch between the energization and interruption of the energization between the storage battery and the electrical load.

[Configuration 2] A vehicular power supply system (100) including a sensor unit (20) that detects a battery state of a storage battery (11) that is capable of supplying electrical power to an electrical load (13), and a control unit (30) that receives the battery state from the sensor unit via a communication path (L38) and performs instruction to perform energization and interruption of the energization between the storage battery and the electrical load based on the received battery state, wherein the sensor unit includes:
a detection unit (21) that detects the battery state of the storage battery; and
a switch drive unit (23) that performs drive control of a switch unit (23a) provided between the storage battery and the electrical load based on the instruction of the control unit to switch between the energization and the interruption of the energization between the storage battery and the electrical load,
the control unit is configured to, in a normal state, output a notification signal indicating the normal state every time a certain time period has elapsed, and
if receiving the notification signal from the control unit every time the certain time period has elapsed, the switch drive unit maintains the energization between the storage battery and the electrical load, and if not receiving the notification signal from the control unit every time the certain time period has elapsed, the switch drive unit performs drive control of the switch unit to interrupt the energization between the storage battery and the electrical load after a predetermined allowable time has elapsed.

[Configuration 3]

The vehicular power supply system according to configuration 1 or 2, wherein
the control unit includes a power supply generation unit (33) that converts electrical power supplied from an auxiliary power supply to generate drive electrical power,
the power supply generation unit is configured to supply the drive electrical power to the switch drive unit, and
if communication from the sensor unit is interrupted or if a notification of occurrence of an abnormality is received from the sensor unit, the control unit determines whether to maintain the energization between the storage battery and the electrical load for a predetermined time period based on the most recently received battery state and maintains or stops supply of the drive electrical power based on the determination.

[Configuration 4]

The vehicular power supply system according to any one of configurations 1 to 3, wherein
the detection unit includes a first current detection unit (21a) that detects a first current value at a first point (P1) on an electrical path between the storage battery and the electrical load and a second current detection unit (21b) that detects a second current value at a second point (P2) different from the first point on the electrical path, and
if the first current value is a first threshold value or greater and the second current value is a second threshold value or greater, the switch drive unit performs drive control of the switch unit to interrupt the energization between the storage battery and the electrical load.

[Configuration 5]

The vehicular power supply system according to configuration 4, wherein
if the number of times the first current value is the first threshold value or more is a predetermined first number of times or more and if the number of times the second current value is the second threshold value or more is a second number of times, which is different from the first number of times, or more, the switch drive unit performs drive control of the switch unit to interrupt the energization between the storage battery and the electrical load.

[Configuration 6]

The vehicular power supply system according to configuration 4 or 5, wherein
- the storage battery is an assembled battery (10) configured by a first battery module (61) and a second battery module (62),
- the first battery module and the second battery module are configured to be capable of being changed between a series connection and a parallel connection,
- the first point is a point (P11) at which a current from the first battery module is capable of being detected in any connection manner,
- the second point is a point (P12) at which a current from the second battery module is capable of being detected in any connection manner,
- when the first battery module and the second battery module are connected in series, if the first current value is the first threshold value or greater and the second current value is the second threshold value or greater, the switch drive unit performs drive control of the switch unit to interrupt the energization between the storage battery and the electrical load, and
- when the first battery module and the second battery module are connected in parallel, if the first current value is the first threshold value or greater or the second current value is the second threshold value or greater, the switch drive unit performs drive control of the switch unit to interrupt the energization between the storage battery and the electrical load, and

[Configuration 7]

The vehicular power supply system according to any one of configurations 1 to 6, further including a discharge circuit (51) that causes a capacitor connected to the electrical load in parallel to discharge charge after the energization is interrupted by the switch drive unit.

The present disclosure has so far been described based on embodiments. However, the present disclosure should not be construed as being limited to these embodiments or the structures. The present disclosure should encompass various modifications, or modifications within the range of equivalence. In addition, various combinations and modes, as well as other combinations and modes, including those which include one or more additional elements, or those which include fewer elements should be construed as being within the scope and spirit of the present disclosure.

A first means for solving the above problem is a vehicular power supply system (100) including a sensor unit (20) that detects a battery state of a storage battery (11) that is capable of supplying electrical power to an electrical load (13), and a control unit (30) that receives the battery state from the sensor unit via a communication path (L38) and performs instruction to perform energization and interruption of the energization between the storage battery and the electrical load based on the received battery state, wherein the sensor unit includes: a detection unit (21) that detects the battery state of the storage battery; a switch drive unit (23) that performs drive control of a switch unit (23a) provided between the storage battery and the electrical load; and a control unit (24) that controls the switch drive unit, the control unit controls the switch drive unit based on the instruction from the control unit to switch between the energization and interruption of the energization between the storage battery and the electrical load, and if determining an abnormality in the control unit or the communication path, the control unit determines whether to maintain the energization between the storage battery and the electrical load based on the battery state detected by the detection unit and controls the switch drive unit based on the determination to switch between the energization and interruption of the energization between the storage battery and the electrical load.

Hence, even if an abnormality is caused in the control unit or the communication path and communication is broken, the control unit determines whether to maintain the energization between the storage battery and the electrical load based on the battery state detected by the detection unit and performs drive control of the switch unit based on the determination. Hence, if no abnormality has been caused in the storage battery, electrical power can be supplied from the storage battery to the electrical load for a certain time.

A second means for solving the above problem is a vehicular power supply system (100) including a sensor unit (20) that detects a battery state of a storage battery (11) that is capable of supplying electrical power to an electrical load (13), and a control unit (30) that receives the battery state from the sensor unit via a communication path (L38) and performs instruction to perform energization and interruption of the energization between the storage battery and the electrical load based on the received battery state, wherein the sensor unit includes: a detection unit (21) that detects the battery state of the storage battery; and a switch drive unit (23) that performs drive control of a switch unit (23a) provided between the storage battery and the electrical load based on the instruction of the control unit to switch between the energization and the interruption of the energization between the storage battery and the electrical load, the control unit is configured to, in a normal state, output a notification signal indicating the normal state every time a certain time period has elapsed, and if receiving the notification signal from the control unit every time the certain time period has elapsed, the switch drive unit maintains the energization between the storage battery and the electrical load, and if not receiving the notification signal from the control unit every time the certain time period has elapsed, the switch drive unit performs drive control of the switch unit to interrupt the energization between the storage battery and the electrical load after a predetermined allowable time has elapsed.

If an abnormality is caused in the control unit or the communication path and communication is broken, the notification signal is not input to the switch drive unit. Hence, if no notification signal is received every time the certain time period has elapsed, the switch drive unit determines that an abnormality has caused and performs drive control of the switch unit to interrupt the energization between the storage battery and the electrical load after the predetermined allowable time has elapsed. Hence, even if an abnormality is caused, electrical power can be supplied from the storage battery to the electrical load for a certain time.

What is claimed is:

1. A vehicular power supply system including a sensor unit that detects a battery state of a storage battery that is capable of supplying electrical power to an electrical load, and a control unit that receives the battery state from the sensor unit via a communication path and performs instruction to perform energization and interruption of the energization between the storage battery and the electrical load based on the received battery state, wherein
the sensor unit includes:
a detection unit that detects the battery state of the storage battery;
a switch drive unit that performs drive control of a switch unit provided between the storage battery and the electrical load; and a control unit that controls the switch drive unit, the control unit controls the switch drive unit based on the instruction from the control unit to switch between the energization and interruption of the energization between the storage battery and the electrical load, if determining an abnormality in the control unit or the communication path, the control unit determines whether to maintain the energization between the storage battery and the electrical load based on the battery state detected by the detection unit and controls the switch drive unit based on the determination to switch between the energization and interruption of the energization between the storage battery and the electrical load, the detection unit includes a first current detection unit that detects a first current value at a first point on an electrical path between the storage battery and the electrical load and a second current detection unit that detects a second current value at a second point different from the first point on the electrical path, if the first current value is a first threshold value or greater and the second current value is a second threshold value or greater, the switch drive unit performs drive control of the switch unit to interrupt the energization between the storage battery and the electrical load, and if the number of times the first current value is the first threshold value or more is a predetermined first number of times or more and if the number of times the second current value is the second threshold value or more is a second number of times, which is different from the first number of times, or more, the switch drive unit performs drive control of the switch unit to interrupt the energization between the storage battery and the electrical load.

2. The vehicular power supply system according to claim 1, wherein the storage battery is an assembled battery configured by a first battery module and a second battery module, the first battery module and the second battery module are configured to be capable of being changed between a series connection and a parallel connection, the first point is a point at which a current from the first battery module is capable of being detected in any connection manner, the second point is a point at which a current from the second battery module is capable of being detected in any connection manner, when the first battery module and the second battery module are connected in series, if the first current value is the first threshold value or greater and the second current value is the second threshold value or greater, the switch drive unit performs drive control of the switch unit to interrupt the energization between the storage battery and the electrical load, and when the first battery module and the second battery module are connected in parallel, if the first current value is the first threshold value or greater or the second current value is the second threshold value or greater, the switch drive unit performs drive control of the switch unit to interrupt the energization between the storage battery and the electrical load.

3. The vehicular power supply system according to claim 1, wherein the control unit includes a power supply generation unit that converts electrical power supplied from an auxiliary power supply to generate drive electrical power, the power supply generation unit is configured to supply the drive electrical power to the switch drive unit, and if communication from the sensor unit is interrupted or if a notification of occurrence of an abnormality is received from the sensor unit, the control unit determines whether to maintain the energization between the storage battery and the electrical load for a predetermined time period based on the most recently received battery state and maintains or stops supply of the drive electrical power based on the determination.

4. The vehicular power supply system according to claim 1, further comprising a discharge circuit that causes a capacitor connected to the electrical load in parallel to discharge charge after the energization is interrupted by the switch drive unit.

5. A vehicular power supply system including a sensor unit that detects a battery state of a storage battery that is capable of supplying electrical power to an electrical load, and a control unit that receives the battery state from the sensor unit via a communication path and performs instruction to perform energization and interruption of the energization between the storage battery and the electrical load based on the received battery state, wherein the sensor unit includes:

a detection unit that detects the battery state of the storage battery; and a switch drive unit that performs drive control of a switch unit provided between the storage battery and the electrical load based on the instruction of the control unit to switch between the energization and the interruption of the energization between the storage battery and the electrical load, the control unit is configured to, in a normal state, output a notification signal indicating the normal state every time a certain time period has elapsed, if receiving the notification signal from the control unit every time the certain time period has elapsed, the switch drive unit maintains the energization between the storage battery and the electrical load, and if not receiving the notification signal from the control unit every time the certain time period has elapsed, the switch drive unit performs drive control of the switch unit to interrupt the energization between the storage battery and the electrical load after a predetermined allowable time has elapsed, the detection unit includes a first current detection unit that detects a first current value at a first point on an electrical path between the storage battery and the electrical load and a second current detection unit that detects a second current value at a second point different from the first point on the electrical path, if the first current value is a first threshold value or greater and the second current value is a second threshold value or greater, the switch drive unit performs drive control of the switch unit to interrupt the energization between the storage battery and the electrical load, and if the number of times the first current value is the first threshold value or more is a predetermined first number of times or more and if the number of times the second current value is the second threshold value or more is a second number of times, which is different from the first number of times, or more, the switch drive unit performs drive control of the switch unit to interrupt the energization between the storage battery and the electrical load.

6. The vehicular power supply system according to claim 5, wherein the storage battery is an assembled battery configured by a first battery module and a second battery module, the first battery module and the second battery module are configured to be capable of being changed between a series connection and a parallel connection, the first point is a point at which a current from the first battery module is capable of being detected in any connection manner, the second point is a point at which a current from the second battery module is capable of being detected in any connection manner, when the first battery module and the second battery module are connected in series, if the first current value is the first threshold value or greater and the second current value is the second threshold value or greater, the switch drive unit performs drive control of the switch unit to interrupt the energization between the storage battery and the electrical load, and when the first battery module and the second battery module are connected in parallel, if the first current value is the first threshold value or greater or the second current value is the second threshold value or greater, the switch drive unit performs drive control of the switch unit to interrupt the energization between the storage battery and the electrical load.

7. The vehicular power supply system according to claim 5, wherein the control unit includes a power supply generation unit that converts electrical power supplied from an auxiliary power supply to generate drive electrical power, the power supply generation unit is configured to supply the drive electrical power to the switch drive unit, and if communication from the sensor unit is interrupted or if a notification of occurrence of an abnormality is received from the sensor unit, the control unit determines whether to maintain the energization between the storage battery and the electrical load for a predetermined time period based on the most recently received battery state and maintains or stops supply of the drive electrical power based on the determination.

8. The vehicular power supply system according to claim 5, further comprising a discharge circuit that causes a capacitor connected to the electrical load in parallel to discharge charge after the energization is interrupted by the switch drive unit.

* * * * *